United States Patent [19]
Lumsden

[11] Patent Number: 6,006,217
[45] Date of Patent: Dec. 21, 1999

[54] TECHNIQUE FOR PROVIDING ENHANCED RELEVANCE INFORMATION FOR DOCUMENTS RETRIEVED IN A MULTI DATABASE SEARCH

[75] Inventor: Mark W. Lumsden, Apex, N.C.

[73] Assignee: International Business Machines Corporation, Armonk, N.Y.

[21] Appl. No.: 08/966,132

[22] Filed: Nov. 7, 1997

[51] Int. Cl.[6] .................................................. G06F 17/30
[52] U.S. Cl. ................................ 707/2; 707/3; 707/10
[58] Field of Search ................................. 707/3, 10, 100, 707/104, 506

[56] References Cited

U.S. PATENT DOCUMENTS

| | | | |
|---|---|---|---|
| 5,659,732 | 8/1997 | Kirsch | 707/5 |
| 5,708,806 | 1/1998 | DeRose et al. | 707/104 |
| 5,715,443 | 2/1998 | Yanagihara et al. | 707/3 |
| 5,768,581 | 6/1998 | Cochran | 707/104 |
| 5,778,367 | 7/1998 | Wesinger, Jr. et al. | 707/10 |
| 5,781,914 | 7/1998 | Stork et al. | 707/506 |
| 5,787,254 | 7/1998 | Maddalozzo, Jr. et al. | 395/200.58 |
| 5,848,413 | 12/1998 | Wolfe | 707/10 |
| 5,873,077 | 2/1999 | Kanoh et al. | 707/3 |
| 5,913,215 | 6/1999 | Rubinstein et al. | 707/10 |

OTHER PUBLICATIONS

Banet, Bernard, "Seybold Report on Desktop Publishing," v10, n8, p17 (6), Apr. 22, 1996.
Banet, Bernard, "Seybold Report on Desktop Publishing," v10, n10, p13 (6), Jun. 10, 1996.

*Primary Examiner*—Paul R. Lintz
*Assistant Examiner*—Ella Colbert
*Attorney, Agent, or Firm*—Gregory M. Doudnikoff

[57] ABSTRACT

A computer implemented technique, system and method for providing enhanced search results for searches for documents on the Internet. In response to a search request form a user at a client computer, a search engine at a search server performs a search for documents at Internet sites matching the search criteria. A list of matching documents is provided to the client in the form of a hits list. For each document on the hits list, a link is provided to a server which will provide the document to the client in an enhanced format. Upon selection of such a link for a document, a message is sent to the server, and the server retrieves the document from its home server, and modifies the document to graphically highlight the matches to the search criteria found in the document and logically links the matches, so that selection of one match in the document by the user will automatically cause the client to display the portion of the document having the next sequential match. The server sends the modified document to the client for review by the user.

9 Claims, 6 Drawing Sheets

TECHNIQUE FOR PROVIDING ENHANCED RELEVANCE INFORMATION FOR DOCUMENTS RETRIEVED IN A MULTI DATABASE SEARCH

BACKGROUND OF THE INVENTION

1. Field of the Invention

The present invention relates to a technique, system and computer program for providing users of search engines with enhanced search results. More particularly, the present invention relates to a technique which permits a user of a search engine to review enhanced search results and more easily determine if a document listed in the search results actually contains information sought by the user.

2. Description of the Related Art

In the past few years there has been an explosive growth in the Internet, and in particular of the World Wide Web (WWW), which is one of the facilities provided on top of the Internet. The WWW comprises many documents or pages or files of information, distributed across many different servers. Each page is identified by a Universal Resource Locator (URL). The URL denotes both the server machine, and the particular document or file or page on that machine. There may be many documents or pages or URLs resident on a single server.

In order to use the WWW, a client runs a piece of software known as a Web browser, such as Netscape Navigator™ from Netscape Communications Corporation. The client interacts with the browser to select a particular URL, which in turn causes the browser to send a request for that URL or page to the server identified in the URL. Typically, the server responds to the request by retrieving the requested page, and transmitting the data for that page back to the requesting client (the client-server interaction is performed in accordance with the hypertext transport protocol ("HTTP")). This page is then displayed by the browser to the user of the browser.

Most WWW pages also contain one or more references to other WWW pages, which need not be on the same server as the original page. Such references may generally be activated by the user selecting particular locations on the screen, typically by (double) clicking a mouse control button. These references or locations are known as hyperlinks, and are typically flagged by the browser in a particular manner (for example, any text associated with a hyperlink may be in a different color). If a user selects the hyperlink, then the referenced page is retrieved and replaces the currently displayed page.

Further information about HTML and the WWW can be found in "World Wide Web and HTML" by Douglas McArthur, p18–26 in Dr Dobbs Journal, December 1994, and in "The HTML SourceBook" by Ian Graham, (John Wiley, New York, 1995).

In 1997, it has been estimated that there are 30 million different Web sites and hundreds of millions of subsidiary pages, with millions of additional sites being added each year. Because the content of the WWW is so vast and is constantly being updated, "search" sites were developed to assist users of the WWW to find desired information. Web sites, such as www.altavista.digital.com, www.excite.com, www.infoseek.com and www.lycospro.lycos.com, have been created which permit users of the WWW to search the Web for desired information. The search sites rely on search engines which go out and search the Web for information, which is then indexed and maintained by the search site. The engines themselves rely on technology called spiders, which are automated software robots, to go out and crawl the Web and collect information about sites. These spiders are the cornerstones of current search, directory and indexing products/sites deployed throughout the Web which permit Web users to gather targeted information. According to a press release dated Sep. 2, 1997, Lycos, Inc. was to soon receive a patent on spidering technology.

Still, when searching an index of Web information, the results of a simple word search can yield a huge number of "hits". Accordingly, a need developed to assist users of the search sites/products to determine which sites they find using the search site are truly pertinent to their searches. One technique for helping users of Web search engines to find relevant Web sites is described in U.S. Pat. No. 5,659,732. As with most search techniques, this technique provides a user with a list of Web sites that may be of interest in response to a user search. Additionally, this technique provides a ranking of each Web site on the list for potential relevance to the user's search based on some internal criteria. However, this technique relies on the relevance of the internal criteria to the user's search in order to provide the user with useful information. To actually determine whether a site is relevant or not, a user must still select the hyperlink provided in the hit list and access the site itself. Of course, this can be quite time consuming.

Accordingly, a need exists for a technique by which a user of a Web search site or product can quickly and easily ascertain whether a site listed in a search results list merits further investigation.

SUMMARY OF THE INVENTION

An object of the present invention is to provide a technique for giving users of Web search products with enhanced search results.

Another object of the present invention is to provide users of a Web search product with search results in context.

Yet another object of the invention is to provide a technique by which more information is provided to the user of a Web search product so that the user can more readily determine the relevance of the sites in listed in search results.

Other objects and advantages of the present invention will be set forth in part in the description and the drawings which follow, and, in part, will be obvious from the description or may be learned by practice of the invention.

To achieve the foregoing objects, and in accordance with the purpose of the invention as broadly described herein, the present invention provides a software implemented process associated with a server employed to provide search information in response to a request from a user at a client for documents available on the Internet matching search criteria, the server having a database associated therewith which includes information about documents available on the Internet, comprising first subprocesses for searching the associated database for documents which match the user's search criteria; second subprocesses for generating a list of documents which match the user's search criteria, the list including, for each document in the list, a server link which upon selection sends a message to the server that the server link for its associated document was selected, and providing the list to the client; third subprocesses for causing the server to retrieve a first document included on the list following user selection of a server link associated with the first document; fourth subprocesses for modifying the document to visually distinguish elements in the document which match the user's criteria and link the elements logically; and fifth subprocesses for sending the modified document to the client for review by the user. Preferably, the fourth subprocesses further comprises linking the elements logically by providing links for each element in the first document which matches the search criteria so that selection of one of the elements causes the client to display a next sequential matching element in the document to the user. Further, the list may also include a document link for each document on the list, wherein, upon selection of one of the document links by the user, the client retrieves the document which corresponds to the selected document link directly from a document server for the corresponding document.

The present invention also provides a method for searching the Internet for documents matching user-input search criteria and providing enhanced search results in a computing environment including a client used by a user, a search server which performs searching, the search server having a database of document information comprising information about document content of documents accessible through the Internet, document servers with which documents are associated, and a document enhancing server, with the client, the search server, the document servers and the document enhancing server being linked together by a network, said method comprising the steps of in response to receipt by the search server of the user-input search criteria, searching the database associated with the search server for documents which match the user-input search criteria; generating a list of documents which match the user-input search criteria, the list including a unique enhanced document request link for each of the documents in the list; sending the list to the client; in response to user selection of a first enhanced document request link which corresponds to a first document from the list, sending an enhanced document request for the first document to the document enhancing server; retrieving the first document by the document enhancing server from a document server on which the first document is maintained; modifying the first document to visually distinguish elements in the first document which match the search criteria and to link the elements logically; and sending the modified first document to the client. Preferably, the search server and the enhanced document server are a single server. Further, the modifying step modifies the first document so that a first sequential match of the search criteria in the first document appears on a portion of first document first displayed by the client to the user.

The present invention also provides a system for providing enhanced search results and an enhanced document in response to a search request for matching documents from any of a plurality of document databases from a user at a client, the search request being made of a server having a multiple database search function, the server having an index associated therewith of documents available from the plurality of databases, the system comprising means for searching the index for documents which match search criteria included in the search request; means for generating a list of documents which match the search criteria, the list including a server link for each of the documents on the list which, upon selection from within the list, sends a message to the server; means for sending the list to the client; means for causing the server to retrieve a first document listed on the list from a document database from the plurality of databases which contains the first document upon receipt by the server of a message generated by selection of a first server link associated with the first document; means for modifying the first document to visually distinguish elements in the first document which match the search criteria and logically link the elements which match the search criteria; and means for sending the modified document to the client. Preferably, each of the plurality of databases is associated with a site on the Internet. Further, the modifying means preferably modifies the first document so that a first sequential match of the search criteria in the first document appears on a portion of first document first displayed by the client to the user.

The present invention will now be described with reference to the following drawings, in which like reference numbers denote the same element throughout.

DESCRIPTION OF THE PREFERRED EMBODIMENT

Figure 1:
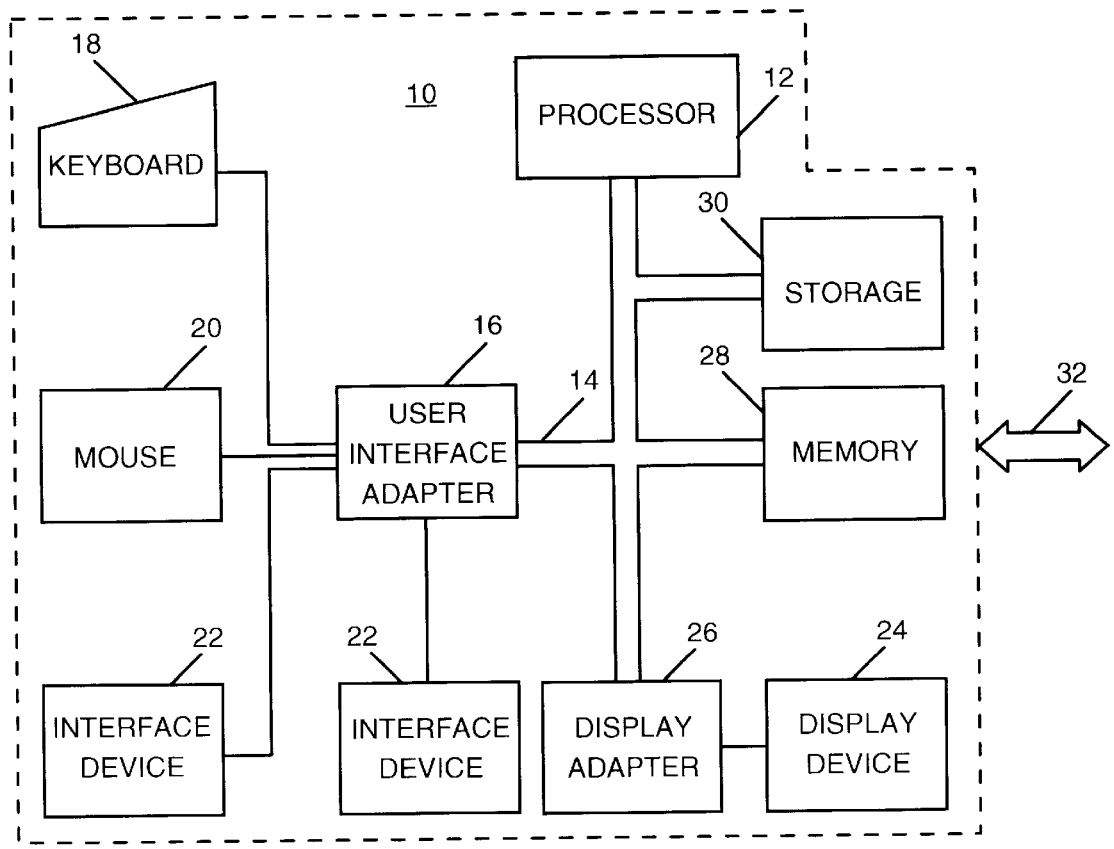
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and permanent storage 30 which can include a hard drive, tape drive, etc.

The workstation 10 communicates via a communications channel 32 with other computers or networks of computers. The workstation 10 may be associated with such other computers in a local area network (LAN) or a wide area network, or the workstation 10 can be a client in a client/server arrangement with another computer, etc. All of these configurations, as well as the appropriate communications hardware and software, are known in the art.

Figure 2:
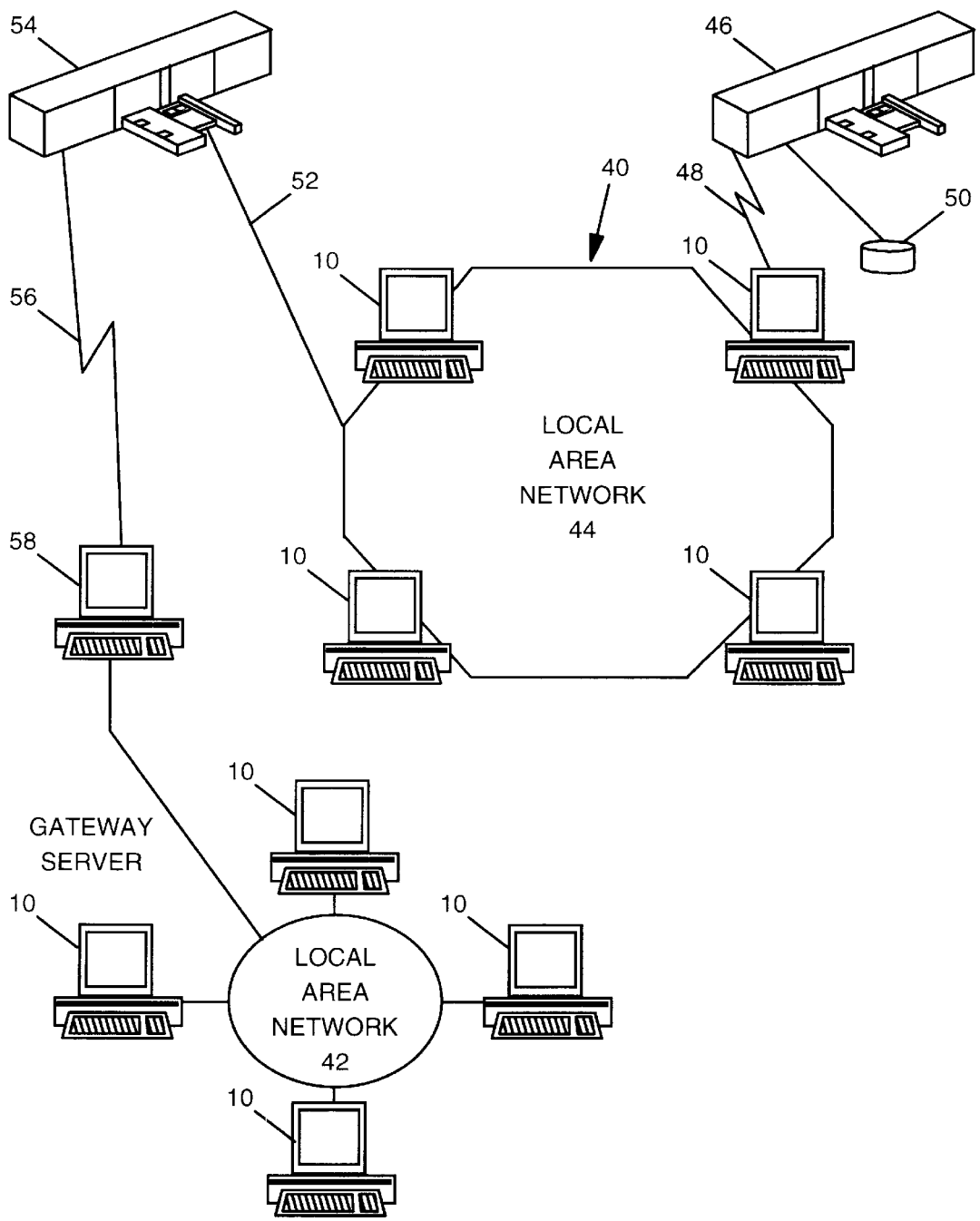
FIG. 2 is a diagram of a networked computing environment in which the present invention may be practiced.

FIG. 2 illustrates a data processing network 40 in which the present invention may be practiced. Networks like this comprise the backbone of the Internet. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400" and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/ communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically stored in permanent storage of some type, such as the permanent storage 30 of the workstation 10. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

The preferred embodiment of the present invention will now be discussed with reference to FIGS. 3 through 5.

Figure 3A:
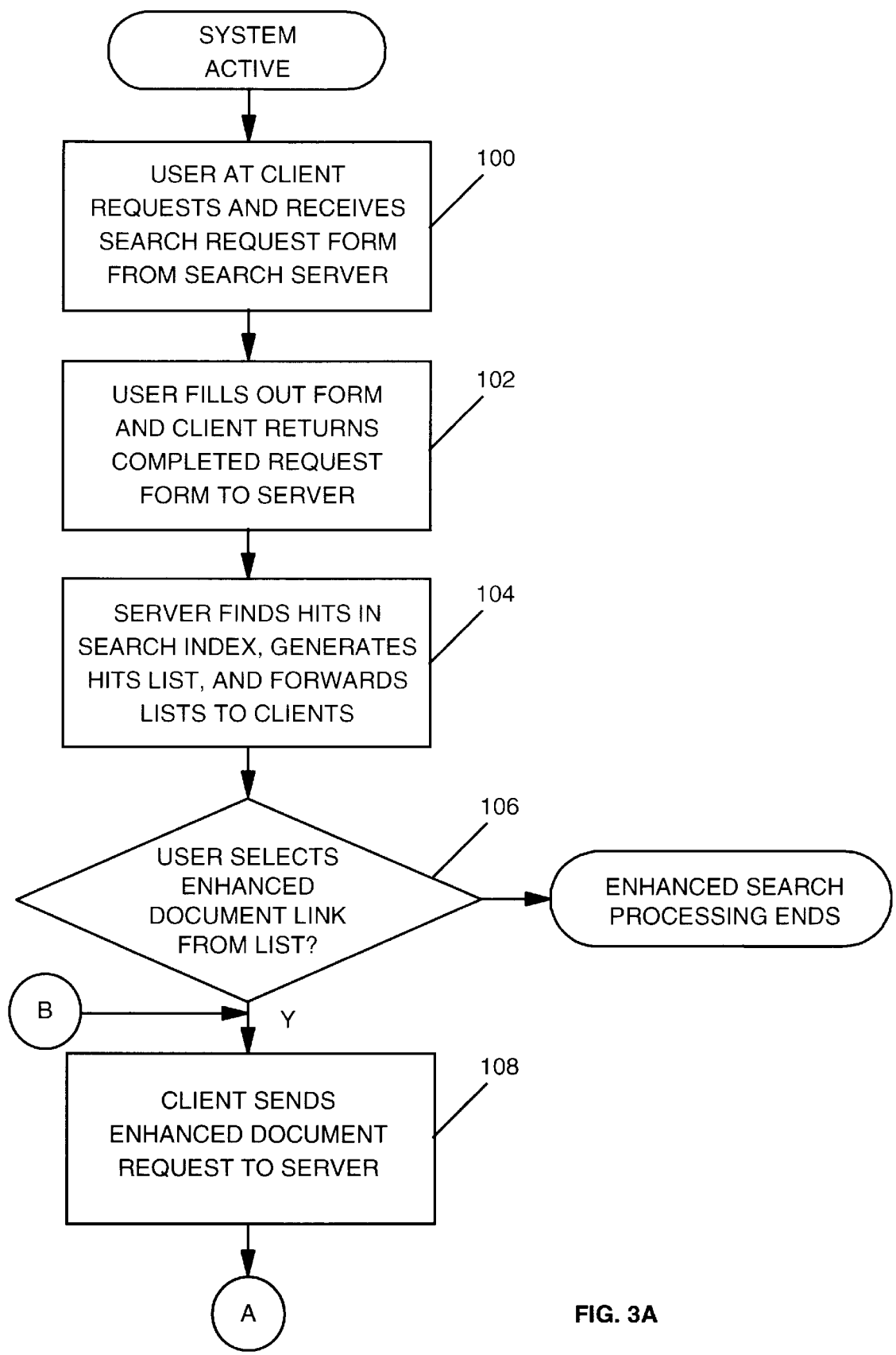
FIGS. 3A–3B illustrate a flow chart which sets forth the logic involved with the present invention.
Figure 3B:
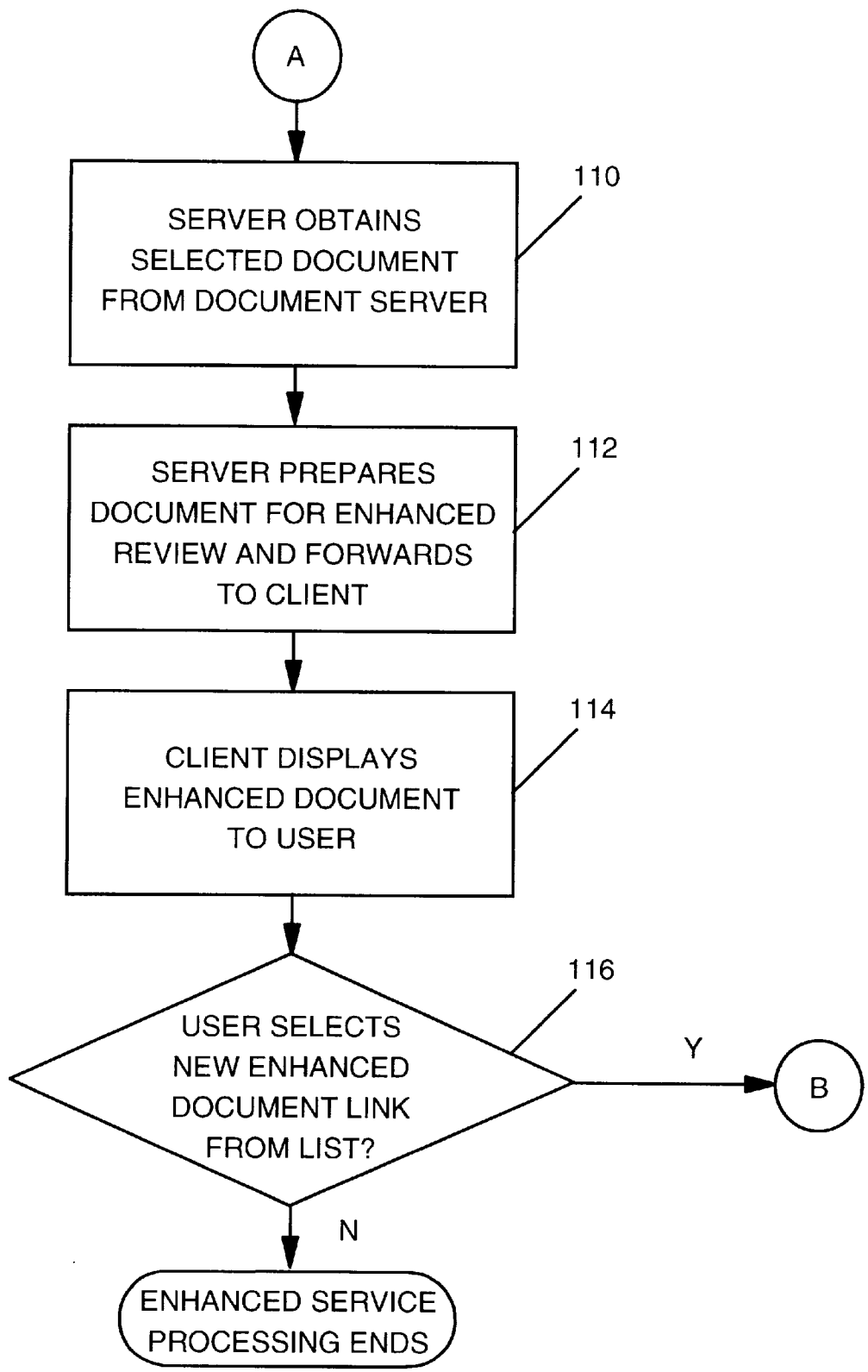
Figure 4:
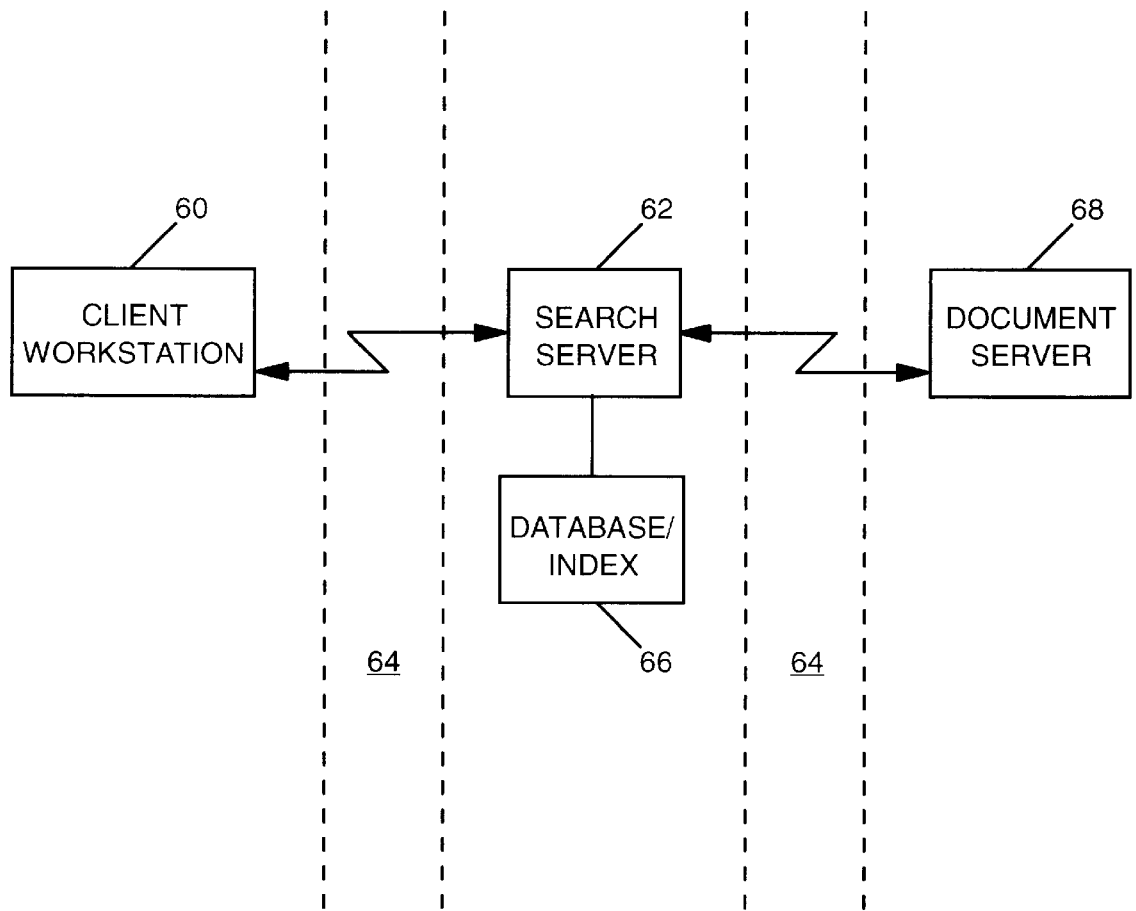
FIG. 4 is a block diagram which illustrates the flow of data according to the present invention.
Figure 5:
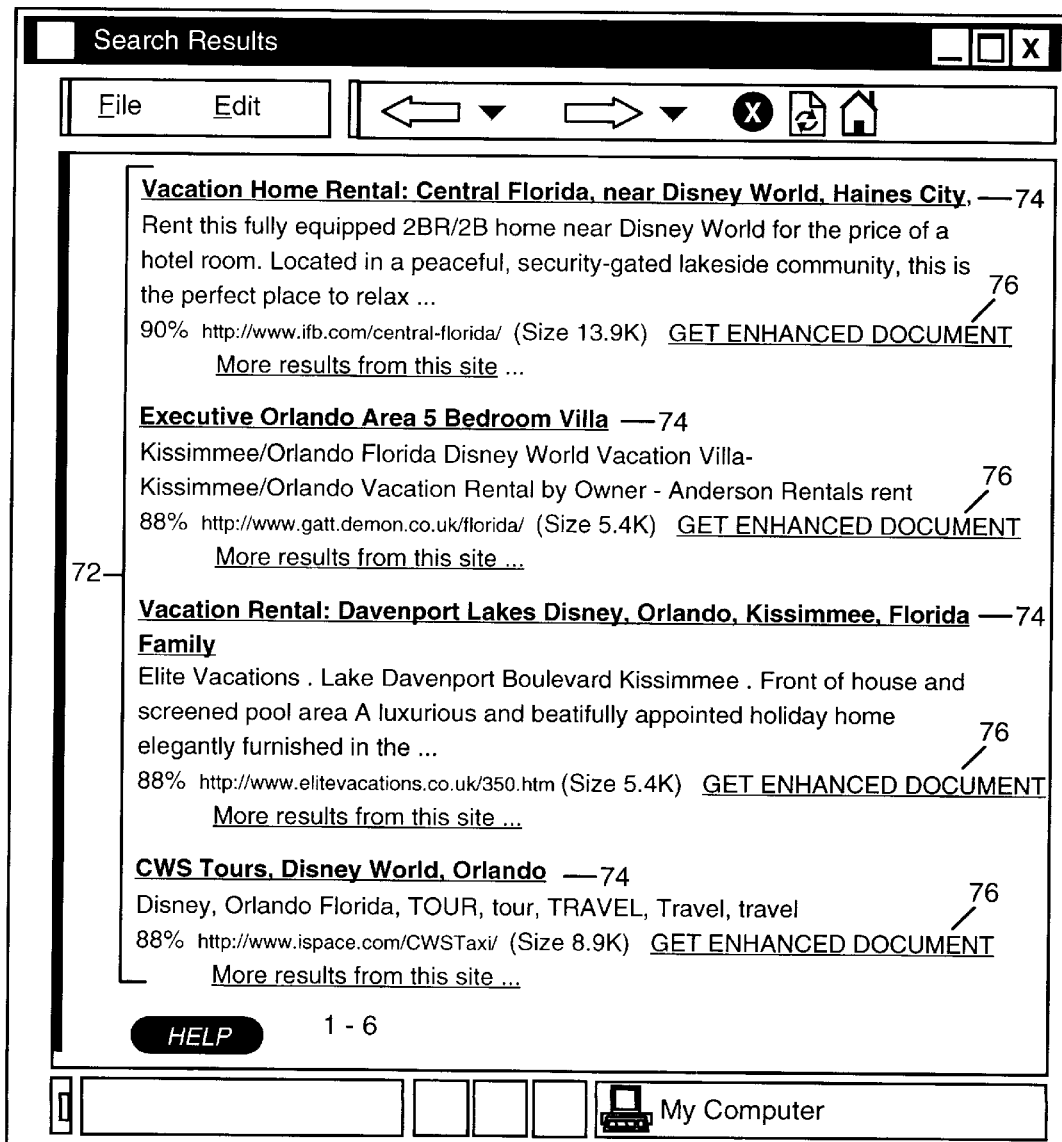
FIG. 5 illustrates a search results list having a link to obtain an enhanced document according to the present invention.

FIG. 3 is a flowchart which sets forth the logic involved with the present invention, and FIG. 4 illustrates the flow of data according to the present invention. As per Step 100 and in accordance with known techniques, a user of a client workstation 60 accesses a search server 62 via a network 64 to obtain a search request form, which is sent back to the client 60. The search server 62 can be any of a number of presently available searching products, such as search engines, which are available as sites on the WWW portion of the Internet, such as Altavista, Lycos and Infoseek. Most such search products have a search request form which is sent to the user/client 60 when the user accesses the search site/server 62. The user fills out the form, specifying the user's search parameters or criteria, which are often in the form of keywords. The user's search parameters or criteria are intended to define a subset of documents from the Internet which contain information which the user wants to review. The desired documents may be on any of a plurality of databases associated with any of the sites (document servers) linked together by the Internet. The user completes the search form and forwards the completed search form to the search server 62 via the network 64 (Step 102).

Preferably, the search server 62 is of a known configuration, such that it maintains its own database 66 of the contents of document servers on the Internet which it obtains and updates through known Web crawling techniques. The search server 62 searches its associated database 66 to find documents which match the specified search parameters and create a hit list of matching documents. Prior art hit lists contain links to the documents (at their respective document servers on the Internet) in the list. According to the present invention, the hit list contains a special link (an enhanced document link) for each document listed therein. A screen capture of a browser 70 having search results in the form of a hit list 72 displayed therein is illustrated in FIG. 5. For each document 74 in the hit list 72, an enhanced document link 76 is provided. The enhanced document links 76 are selectable by the user from the list 72, and each selectable link 76 is visually distinguished on the list 72 to make it clear to the user that its selection relative to its associated document will retrieve an enhanced version of the associated document. The enhanced document link may take the form of a URL or text or both, which will intuitively indicate to the user what the user is selecting. Providing visual links which are suggestive to users is known in the art, and will not be further discussed herein. This hit list is forwarded to the client 60 (Step 104).

Preferably, the list is not kept at the search server 62 after it is forwarded to the client 60, as this would require the storage of many lists and large amounts of data, and require extensive housekeeping at the search server 62. Rather, each enhanced document link preferably has data associated with it that upon selection by the user at the client 60, information is sent from the client 60 to a URL specified by the link. Although the URL may be the search server 62 or a specific portion of the search server 62 which is dedicated for providing an enhanced document per the present invention, the URL may be for an entirely separate server or site which is dedicated to providing enhanced documents in accordance with the present invention. Whichever the case, the receiving server (the document enhancing server) receives data which includes client information (so that the results of processing can be returned to the client), the URL for the document, and a message that an enhanced document is to be returned to the client in response to the sending of the message by the client 60.

If the user then selects the enhanced document link for one of the documents in Step 106, the request is sent to the appropriate server. Preferably, the enhanced document processing facility will be associated with or part of the search server 62. In this case, the request is returned to the search server 62 (Step 108). The search server 62 then contacts a document server 68 on which the desired document resides via the network 64, and receives the document from the document server 68 (Step 110). In Step 112, the search server 62 then prepares the document for review by the user before forwarding the document back to the client 60. Preferably, the preparation includes modifying the search criteria matches as they appear in the document so that the matches will be visually distinctive to the user when the user views the document. For example, if the user had used keywords "Orlando", "vacation" and "home" in the search request form, the search server 62 would visually alter these terms in the document relative to the rest of the document so that the user would be able to easily find these words within the document. Further, the document is also modified to include code that causes user selection of one of the matching keywords in the document change the display of the document on the client 60 to display to the user to the next occurrence of a matching keyword in the document. The document can also be sent to the client 60 so that the portion thereof which includes the first occurrence of a matching keyword is displayed by the client 60 to the user when the document is first displayed by the client workstation 60. This coding can take the form of a Java applet which is embedded in the document by the search server 62. Specific techniques for providing the linking function are known in the art, and will not be further discussed herein.

This enhanced document is then forwarded by the search server 62 to the client 60 (Step 114). Preferably, the modified document is displayed to the user by the client 60 so that a portion of the document containing the first occurrence of a matching keyword is initially displayed to the user. The user may then navigate within the document to the next sequential keyword occurrence by selecting the displayed keyword within the document. In this way, the user can quickly determine whether or not the document contains information which the user is seeking.

When the user is finished reviewing the first modified document, having either digested its contents or determined that the document does not contain desired information, the user can access the hit list (most typically by selecting the "back" option in the browser) and select another document from the document list, or the user may choose not to select another document or not find it necessary to select another document. If the user selects the search server link for a new document per Step 116, the processing described above relative to Steps 108 through 114 is repeated for the newly selected document. If no new document is selected from the list, processing ends. Similarly, if in Step 106, the user had not selected any document from the list to begin with, processing relative to the list would not continue.

The document processing according to the present invention may be used in combination with known search techniques. For example, the list of potentially matching documents may be provided to the user with two links relative to each document. One link may link back to the server and request the enhanced document processing, while the other link may be a direct link to the document server for the requested document. This would permit the user to directly access the document, and save the user time. The direct link option would be preferred when the user knows or is quite sure that the listed document contains desired information. Similarly, the enhanced document processing technique of the present invention could be combined with other techniques for assisting the user in the determination of document relevance, such as relevance ranking, in which each document the hit list is given a relevance ranking based on relevance criteria.

While the preferred embodiment of the present invention has been described herein, additional variations and modifications in that embodiment may occur to those skilled in the art once they learn of the basic inventive concepts. Therefore, it is intended that the appended claims shall be construed to include both the preferred embodiment and all such variations and such modifications as fall within the spirit and scope of the invention.

I claim:

1. In a computing environment, computer readable code associated with a server employed to provide search information in response to a request from a user at a client for documents available on the Internet matching search criteria, the server having a database associated therewith which includes information about documents available on the Internet, comprising:

first subprocesses for searching the associated database for documents which match the user's search criteria;

second subprocesses for generating a list of documents which match the user's search criteria, said list including, for each document in the list, a server link which upon selection sends a message to the server that the server link for its associated document was selected, and providing the list to the client;

third subprocesses for causing the server to retrieve a first document included on the list following user selection of a server link associated with the first document;

fourth subprocesses for modifying the first document to visually distinguish elements in the document which match the user's search criteria and link the elements logically by providing links for each element in the first document which matches the user's search criteria so that selection of one of the elements causes the client to display a next sequential matching element in the first document to the user; and fifth subprocesses for sending the modified document to the client for review by the user.

2. Computer readable code according to claim 1, wherein said fourth subprocesses are performed by a document enhancement server.

3. Computer readable code according to claim 1, wherein the list also includes a document link for each document on the list, wherein, upon selection of one of the document links by the user, the client retrieves the document which corresponds to the selected document link directly from a document server for the corresponding document.

4. In a computing environment, a method for searching the Internet for documents matching user-input search criteria and providing enhanced search results, the computing environment including a client used by a user, a search server which performs searching, the search server having a database of document information comprising information about document content of documents accessible through the Internet, document servers with which documents are associated, and a document enhancing server, with the client, the search server, the document servers and the document enhancing server being linked together by a network, said method comprising the steps of:

in response to receipt by the search server of the user-input search criteria, searching the database associated with the search server for documents which match the user-input search criteria;

generating a list of documents which match the user-input search criteria, the list including a unique enhanced document request link for each of the documents in the list;

sending the list to the client;

in response to user selection of a first enhanced document request link which corresponds to a first document from the list, sending an enhanced document request for the first document to the document enhancing server;

retrieving the first document by the document enhancing server from a document server on which the first document is maintained;

modifying the first document to visually distinguish elements in the first document which match the search criteria and to link the elements logically so that selection of at least one linked element which matches said search criteria causes said client to display a next sequential matching link; and sending the modified first document to the client.

5. A method for providing enhanced search results according to claim 4, wherein the search server and the enhanced document server are a single server.

6. A method for providing enhanced search results according to claim 4, wherein said modifying step modifies the first document so that a first sequential match of the search criteria in the first document appears on a portion of first document first displayed by the client to the user.

7. A system for providing enhanced search results and an enhanced document in response to a search request for matching documents from any of a plurality of document databases from a user at a client, the search request being made of a server having a multiple database search function, the server having an index associated therewith of documents available from the plurality of databases, comprising:

means for searching the index for documents which match search criteria included in the search request;

means for generating a list of documents which match the search criteria, the list including a server link for each of the documents on the list which, upon selection from within the list, sends a message to the server;

means for sending the list to the client;

means for causing the server to retrieve a first document listed on the list from a document database from the plurality of databases which contains the first document upon receipt by the server of a message generated by selection of a first server link associated with the first document;

means for modifying the first document to visually distinguish elements in the first document which match the search criteria and logically link the elements which match the search criteria so that selection of one of the elements by the user when the first document is displayed to the user by the client causes the client to display another matching element in the first document to the user; and means for sending the modified document to the client.

8. A system according to claim 7, wherein each of the plurality of databases is associated with a site on the Internet.

9. A system according to claim 7 wherein said modifying means modifies the first document so that a first sequential match of the search criteria in the first document appears on a portion of first document first displayed by the client to the user.

* * * * *